United States Patent
Beverly

(10) Patent No.: US 7,313,633 B2
(45) Date of Patent: Dec. 25, 2007

(54) METHODS AND APPARATUS FOR UPDATING ADDRESS RESOLUTION DATA

(75) Inventor: Harlan T. Beverly, McDade, TX (US)

(73) Assignee: Intel Corporation, Santa Clara, CA (US)

( * ) Notice: Subject to any disclaimer, the term of this patent is extended or adjusted under 35 U.S.C. 154(b) by 896 days.

(21) Appl. No.: 10/454,655

(22) Filed: Jun. 4, 2003

(65) Prior Publication Data

US 2004/0249879 A1 Dec. 9, 2004

(51) Int. Cl.
G06F 15/16 (2006.01)
H04L 12/56 (2006.01)

(52) U.S. Cl. .................. 709/245; 709/223; 370/395.54

(58) Field of Classification Search ...................... None
See application file for complete search history.

(56) References Cited

U.S. PATENT DOCUMENTS

| | | | | |
|---|---|---|---|---|
| 5,701,462 | A * | 12/1997 | Whitney et al. | 709/246 |
| 6,681,258 | B1 * | 1/2004 | Ratcliff et al. | 709/245 |
| 6,792,471 | B2 * | 9/2004 | Nomura et al. | 709/246 |
| 6,904,456 | B2 * | 6/2005 | Cox | 709/219 |
| 7,003,555 | B1 * | 2/2006 | Jungck | 709/246 |

OTHER PUBLICATIONS

Oguchi, N. et al. "RISP: Address Resolution Protocol in Network Layer." 23rd annual conference on Local Computer Networks. 1998. pp. 99-108.*

Kohler, Eddie et al. "The Click Modular Router." ACM Transactions on Computer Systems. vol. 18, No. 3. Aug. 2000. pp. 263-297. ACM Press.*

Cardellini, Valeria et al. "The State of the Art in Locally Distributed Web-Server Systems." ACM Computing Surveys. vol. 34, No. 2. Jun. 2002. pp. 263-311. ACM Press.*

* cited by examiner

Primary Examiner—Andrew Caldwell
Assistant Examiner—Jeffrey R. Swearingen
(74) Attorney, Agent, or Firm—Buckley, Maschoff & Talwalkar LLC

(57) ABSTRACT

An inbound data message is received. An address resolution table is searched for the address of the source of the data message at a time when the address resolution table is not being searched to support transmission of an outbound data message. If a search in connection with an outbound data message is occurring when the inbound data message is received, the source address for the inbound data message is stored in a FIFO memory. The storage of the source address for the inbound message may be inhibited if the source address is already stored in the FIFO memory. The same search engine may be used in connection with searches for both outbound and inbound data messages.

12 Claims, 9 Drawing Sheets

200

| IP ADDRESS | ARP TABLE POINTER |
|---|---|
| 10.1.132.2 | 0 |
| 192.0.0 | 1 |
| 192.168.0.0 | 2 |
| 192.168.12.0 | 3 |
| 192.168.12.129 | 4 |
| 206.21.133.0 | 5 |
| 206.234.122.4 | 6 |

202 → (rows)  204 → (rows)

| ETHERNET ADDRESS | TIME DATA |
|---|---|
| 0123AC230978 | 1 ms |
| 845634659AAB | 2 s |
| 72B312BC12CC | 3 ns |
| 11FF23FCC567 | 4 ms |
| 87992233CCDD | 2 ms |
| 12AABBCCDDEE | 3 ms |
| 123344998822 | 8 ns |

302 → (rows)  304 ↗  306 ↖

FIG. 3

| IP ADDRESS | ETHERNET ADDRESS | TIME DATA |
|---|---|---|
| 10.1.132.2 | 0123AC230978 | 1 ms |
| 192.0.0 | 845634659AAB | 2 s |
| 192.168.0.0 | 72B312BC12CC | 3 ns |
| 192.168.12.0 | 11FF23FCC567 | 4 ms |
| 192.168.12.129 | 87992233CCDD | 2 ms |
| 206.21.133.0 | 12AABBCCDDEE | 3 ms |
| 206.234.122.4 | 123344998822 | 8 ns |

METHODS AND APPARATUS FOR UPDATING ADDRESS RESOLUTION DATA

BACKGROUND

Communication via the well-known Internet Protocol (IP) may require translation (resolution) of an IP address into a "lower layer" address such as an Ethernet address. For this purpose, one or more tables may be maintained to allow look-up of the lower layer address on the basis of the IP address. It is customary to maintain an indication in such a table or tables as to whether there has been recent activity using the lower layer address. If there has not been recent activity for a particular IP address, an ARP (address resolution protocol) request may be generated to determine a current lower layer address for the IP address in question.

According to some conventional practices, the indication of activity with regard to an IP address is updated in the table entry corresponding to the IP address upon transmission of a data message (e.g., a data packet) to the IP address. It has also been proposed that the indication of activity for an IP address be updated upon receipt of a data message from a device having the IP address. However, this may require additional table searches that may interfere with table searching activity required for transmission of outbound messages.

BRIEF DESCRIPTION OF THE DRAWINGS

FIG. 2 is a schematic representation of a route table maintained in the data processing device of FIG. 1 according to some embodiments.

FIG. 3 is a schematic representation of an address resolution protocol (ARP) table maintained in the processing device of FIG. 1 according to some embodiments.

DETAILED DESCRIPTION

Figure 1:
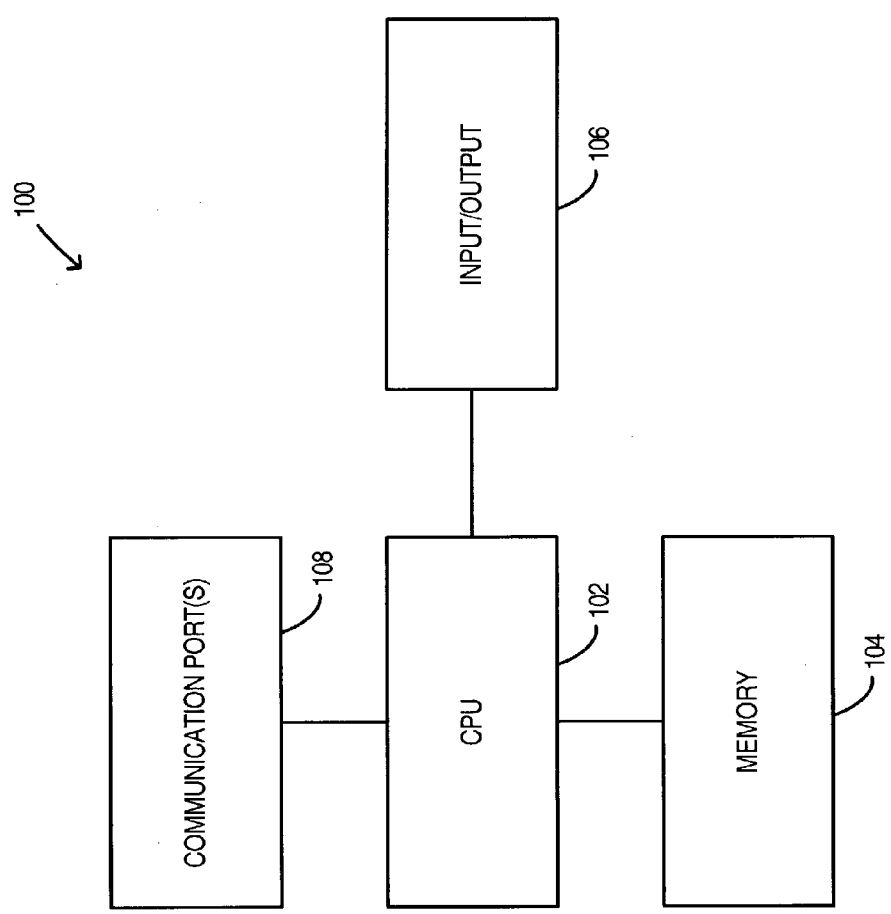
FIG. 1 is a simplified block diagram of a data processing device according to some embodiments.

FIG. 1 is a block diagram of a data processing device 100 according to some embodiments. In some embodiments, the data processing device 100 may be a personal computer or a laptop computer. In terms of its hardware, the data processing device 100 may be entirely conventional in some embodiments.

The data processing device 100 includes a central processing unit (CPU) 102, which may be a conventional microprocessor or microcontroller. Also included in the data processing device 100 are one or more memory components 104 which are coupled to the CPU 102 to allow data to be stored in the memory components 104 by the CPU 102 and/or retrieved from the memory components 104 by the CPU 102. The memory components 104 may include one or more of random access memory (RAM), read only memory (ROM), flash memory, and a mass storage device or devices such as a hard drive, a floppy disk drive, a CD-ROM drive, a DVD drive, a ZIP drive, etc.

The data processing device 100 also includes one or more input/output (I/O) devices 106 coupled to the CPU 102 and including one or more of, e.g., a display monitor, a touch screen, a keyboard, a mouse, a touch pad, a track ball and a printer. The data processing device 100 further includes one or more communication ports 108 that are coupled to the CPU 102 and by which the data processing device 100 may exchange data with other devices, which are not shown. The communication port or ports may provide for one or more of wireless communications or communication by wire, cable or optical fiber.

FIG. 2 is a schematic representation of a route table 200 that may be maintained in the data processing device 100 according to some embodiments. The route table 200 includes a plurality of entries 202, each of which corresponds to an IP address of a device with which the data processing device 100 has been, is, or may be in data communication. Each entry 202 also includes a field 204 which contains a pointer to an entry in another table (as will be seen, an address resolution protocol table) at which a lower layer address (e.g., an Ethernet address) may be found to resolve the respective IP address for the entry 202.

FIG. 3 is a schematic representation of an address resolution protocol (ARP) table 300 that also may be maintained in the data processing device 100 according to some embodiments. The ARP table 300 includes entries 302 which respectively correspond to the pointers in the fields 204 of the entries 202 of the route table 200 (FIG. 2). Each entry 302 includes a lower layer address (e.g., an Ethernet address) in an address field 304 and activity data in an activity data field 306. The lower layer address of the entry 302 corresponds to the IP address of the entry 202 which points to the entry 302. The activity data of the entry 302 is data that indicates whether there has been recent message traffic with the device that corresponds to the lower layer address of the entry 302. The activity data may, for example, take the form of a timestamp or other time data (somewhat schematically indicated in the activity data fields 306).

Figures 4, 6:
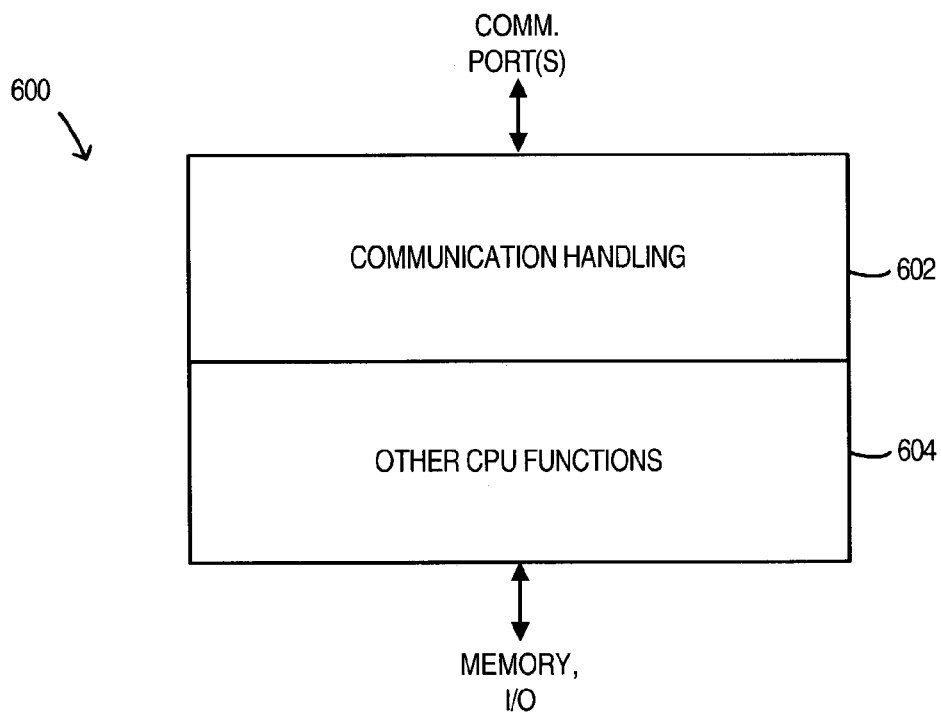
FIG. 4 is a schematic representation of a combined route/ARP table maintained in the processing device of FIG. 1 according to some other embodiments.
FIG. 6 is a simplified block diagram which shows a CPU that may incorporate some communication handling functions provided according to some embodiments.

FIG. 4 is a schematic representation of a combined route/ARP table 400 that may, in some embodiments, be maintained in the data processing device 100 in place of the tables shown in FIGS. 2 and 3. The table 400 includes entries 402, each of which has an IP address field 404, a lower layer address field 406 and an activity data field 408. It will be appreciated that the table 400 stores a corresponding lower layer address (e.g., an Ethernet address) and corresponding activity data directly in the same table with each IP address. Consequently, routing information may be determined without accessing a separate table, and current activity data is also indexed in the same table by the IP address.

As used herein and in the appended claims, "address resolution table" refers to one or more of a route table, an ARP table, and a combined route/ARP table, or any other table utilized to translate or resolve one type of address into another type of address.

Figure 5:
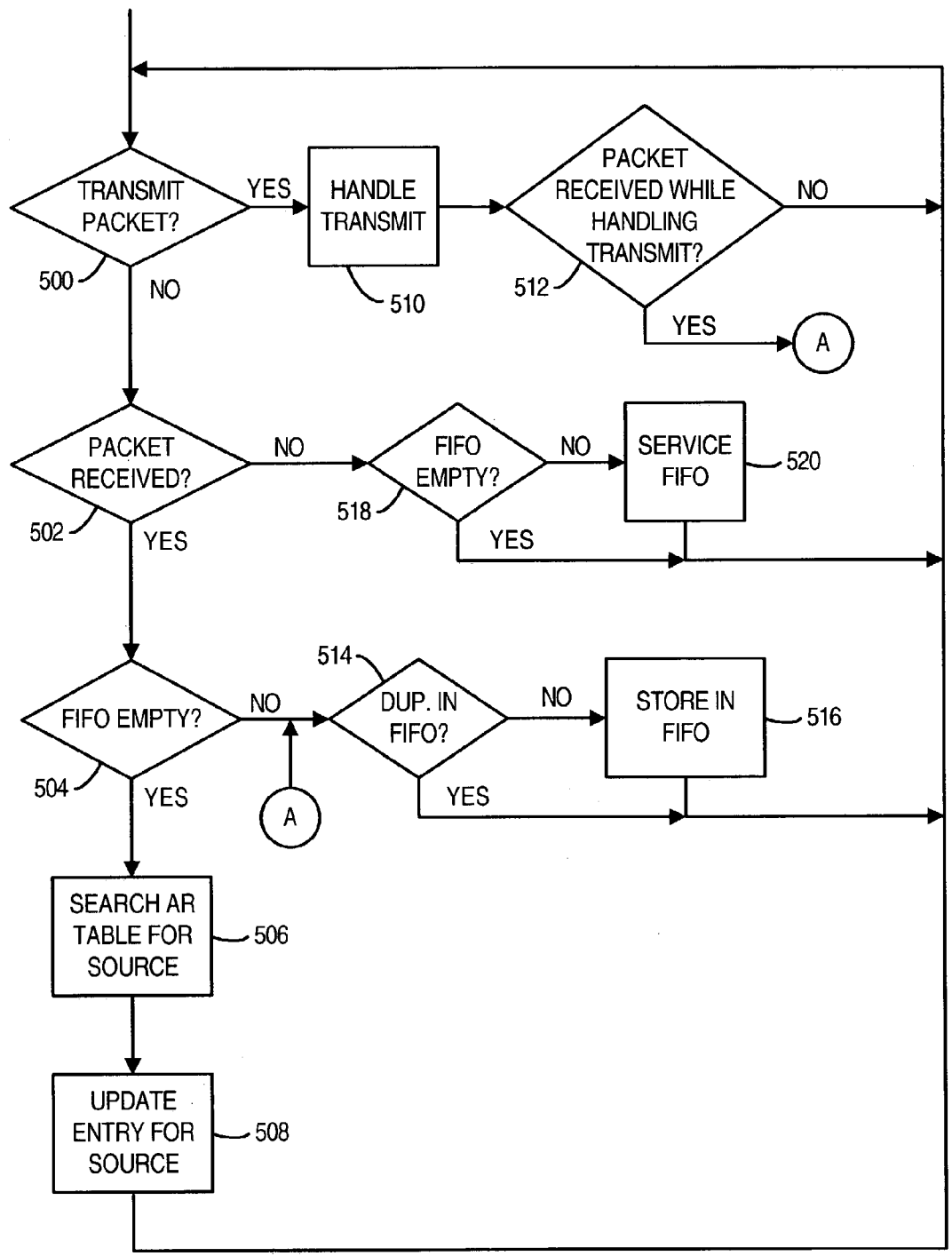
FIG. 5 is a flow chart that illustrates a process for updating activity indications in one or more of the tables of FIGS. 2-4 according to some embodiments.

FIG. 5 is a flow chart that illustrates a process by which activity data in the table 300 or the table 400 may be updated according to some embodiments.

At 500 in FIG. 5, it is determined whether transmission of a data message (e.g., a data packet) is currently requested or is pending. Transmission of a data message may be "pending", for example, when transmission of a second data message is requested while transmission of a prior data message is being handled.

If it is determined at 500 that transmission of a data message has not been requested and is not pending, then it is determined, at 502, whether a data message has been received from an external device (i.e., it is determined whether an inbound data message has been received). If so, it is next determined, at 504, whether a FIFO (first in/first out) memory to be discussed below is empty. If it is the case that the FIFO memory is empty, then the address resolution table is searched (as indicated at 506) to find the entry which corresponds to the IP address of the device (not shown) which is the source of the data message found to have been received at 502. For example, if the data processing device 100 maintains separate route and ARP tables, then the route table is searched to find the entry for the IP address for the source device, and then, based on the pointer in that entry, the corresponding entry in the ARP table is accessed. Alternatively, if the data processing device 100 maintains a combined route/ARP table, then that table is searched to find the entry for the IP address for the source device. The searching of the table in question may be performed in accordance with any search algorithm that is convenient, including, for example, a binary search, a linear search, a cam search, a hash search, etc. In the case of searching either the route table or the combined route/ARP table, the search (and access to ARP table, if appropriate) results in finding the table entry (302 or 402, as the case may be) which contains the activity data field (306 or 408, as the case may be) which holds the activity data for the source IP address for the data message that was received. Then, at 508 (FIG. 5), the activity data field in question is updated to reflect the receipt of the data message from the source IP address. For example, the activity data field may be updated by writing into it a timestamp which represents a current time reading provided by a timer. (The timer is not separately shown, but may be provided by hardware, software or firmware.)

After 508, the process of FIG. 5 loops back to 500.

In the case that it is determined at 500 that transmission of a data message has been requested or is pending, then appropriate steps are taken to handle transmission of the requested or pending data message or data messages, as indicated at 510. As part of handling the transmission of a data message, it may be necessary to search the address resolution table to ascertain the lower layer address to which the data message is to be sent. When the table entry 302 or 402 (as the case may be) which corresponds to the destination address is found, the activity data field for that table entry may, in some embodiments, be updated to reflect the activity of transmitting the data message to the destination address. As in the case of 508, the updating of the activity data field may include writing a timestamp into the activity data field. In other embodiments, there may be no updating of the activity data field upon transmission of a data message to the corresponding address.

As a part of 510, or afterward, it may be determined, as indicated at 512, whether an inbound data message is received during the course of handling the transmission of the requested or pending outbound data message. For example, it may be determined at 512 whether an inbound data message is received during the course of searching the address resolution table. If it is determined at 512 that no inbound data message is received, then the process of FIG. 5 loops back from 512 to 500. However, if it is found at 512 that an inbound data message is received during handling of transmission of an outbound message and/or during searching of an address resolution table for the purpose of transmitting an outbound message, then it is determined, as indicated at 514, whether the above-mentioned FIFO memory already holds an IP address that is the same as (i.e., a duplicate of) the IP address of the source of the inbound data message that was found to have been received at 512. If a negative determination is made at 514 (i.e., no duplicate is found of the source address in the FIFO memory) then the source address of the data message found to have been received at 512 is stored in the FIFO memory, as indicated at 516. The process of FIG. 5 then loops back to 500.

If a positive determination is made at 514 (i.e., a duplicate of the source address is found in the FIFO memory) then the process of FIG. 5 loops back to 500 without storing in the FIFO (a duplicate of) the IP address of the data message found to have been received at 512.

If a negative determination is made at 502 (i.e., if it is determined at 502 that no data message has been received), then it is determined, as indicated at 518, whether the FIFO memory is empty. If so, then the process of FIG. 5 loops back to 500. However, if a negative determination is made at 518 (i.e., it is found that there is at least one entry in the FIFO memory that has not been "serviced"), then the oldest entry in the FIFO is "serviced", as indicated at 520. As will be understood by the above discussion of 516, an "entry" in the FIFO memory is an IP address that has been stored in the FIFO memory and that corresponds to a source of an inbound data message that has been received, and for which the address resolution table (or tables, as the case may be) has not yet been searched and updated. "Servicing" an entry in the FIFO refers to searching the address resolution table or tables for the source IP address which constitutes the FIFO memory entry, and updating the activity data which corresponds to that IP address.

After the oldest entry in the FIFO address has been serviced, as indicated at 520, the process of FIG. 5 loops back to 500.

If a negative determination is made at 504 (i.e., it is found that there is at least one entry in the FIFO memory that has not been serviced), then it is determined, as indicated at 514, whether the FIFO memory already holds an IP address that is the same as (i.e., a duplicate of) the IP address of the source of the inbound data message that was found to have been received at 502. If a negative determination is made at 514 (i.e., no duplicate is found of the source address in the FIFO memory) then the source address of the data message found to have been received at 502 is stored in the FIFO memory, as indicated at 516. The process of FIG. 5 then loops back to 500.

If a positive determination is made at 514 (i.e., a duplicate of the source address is found in the FIFO memory) then the process of FIG. 5 loops back to 500 without storing in the FIFO (a duplicate of) the IP address of the data message found to have been received at 502.

Software which implements the process illustrated in FIG. 5 may be employed in some embodiments to program the CPU 102 (FIG. 1) and may be stored in one or more of the memory components 104.

One notable aspect of the process of FIG. 5 is that searching of the address resolution table or tables to support transmission of outbound data messages is given priority over searching of the address resolution table or tables for the purpose of updating activity data fields corresponding to IP addresses of the sources of inbound messages. Accordingly, the additional searching traffic required for updating activity fields in response to receiving data messages does not interfere with the timely transmission of outbound data messages. The FIFO memory referred to above is provided to store IP addresses of the sources of received data messages in the cases where searching of the address resolution table or tables in regard to the source IP addresses of the received data messages is deferred to accommodate searching to support transmission of outbound data messages. (The FIFO memory, which is not separately shown, may be one of the memory components 104 (FIG. 1). For example, the FIFO memory may be maintained as part of a RAM, with suitable software pointers.)

Also, to avoid unnecessary searching of duplicate source IP addresses, the FIFO memory is examined before storing an IP address in the FIFO memory to assure that the IP address in question is not already stored in the FIFO memory. Thus duplicate storage in the FIFO memory of the IP address of the source of an received inbound data message is inhibited if it is determined that the FIFO memory already stores the IP address in question.

At a time when searching of the address resolution table or tables to support transmission of an outbound data message is not taking place, a source IP address that has been stored in the FIFO memory may be retrieved from the FIFO memory. The address resolution table or tables may be searched in regard to the retrieved source IP address and the corresponding entry in the address resolution table may then be updated to reflect the activity of having received the inbound data message. The same search routine may be called both to support transmission of outbound data messages (as referred to at 510 in FIG. 5) and to update activity fields in regard to receiving inbound data messages (as referred to at 506 or 520 in FIG. 5).

Figure 5A:
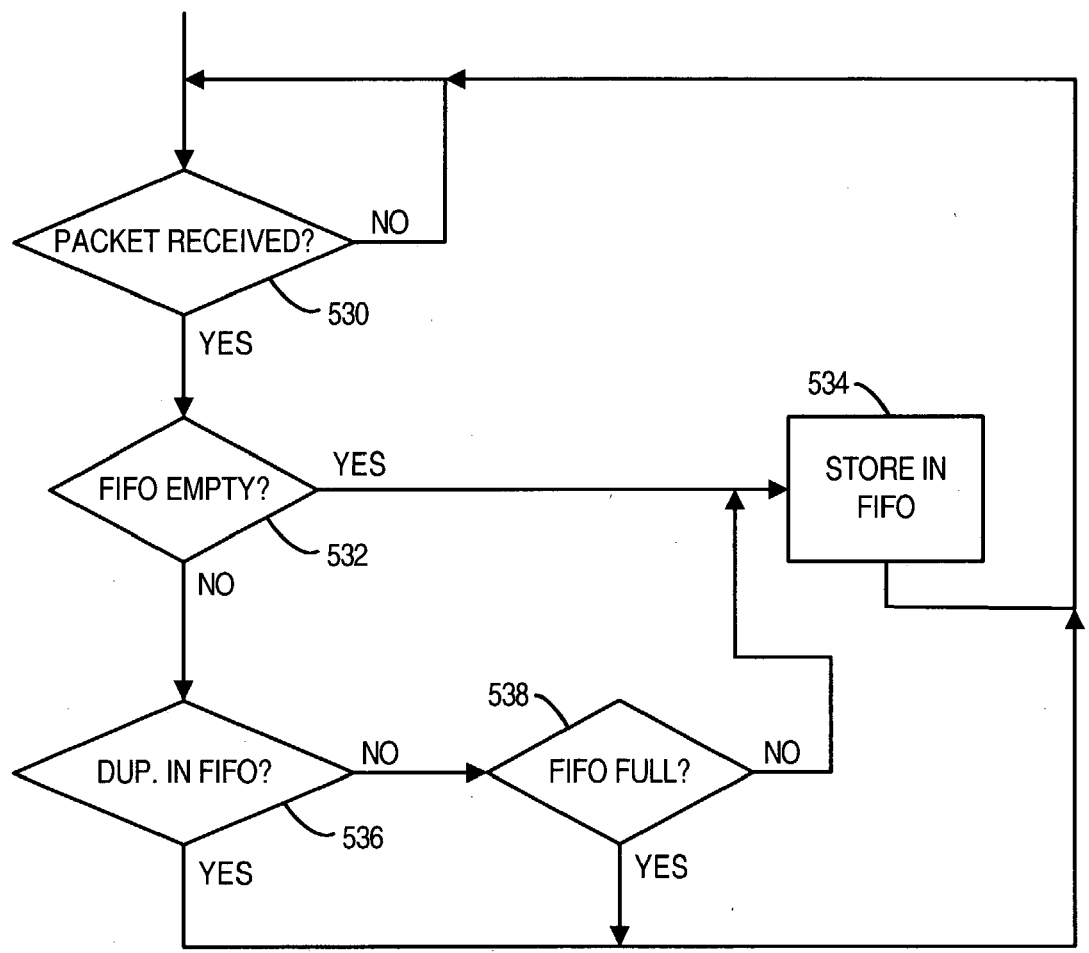
FIGS. 5A and 5B are flow charts that illustrate processes for updating activity indications in one or more of the tables of FIGS. 2-4 according to some other embodiments.
Figure 5B:
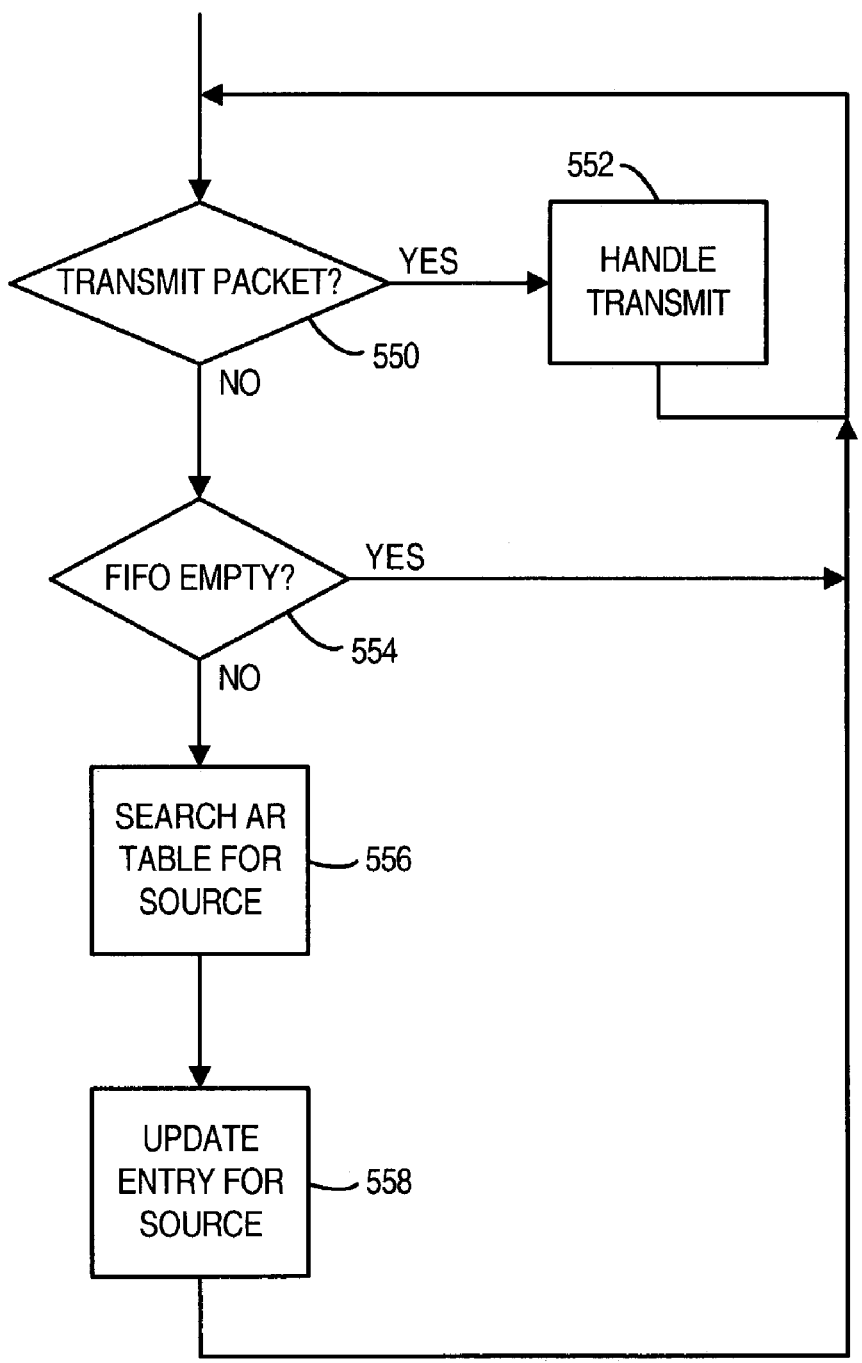

FIGS. 5A and 5B are flow charts that illustrate alternative processes that may be employed to update activity data in the table 300 or the table 400 according to some other embodiments. The respective processes of FIGS. 5A and 5B may be separate from each other but related to each other by both interacting with the same FIFO memory.

At 530 in FIG. 5A, it is determined whether a data message has been received from an external device (i.e., it is determined whether an inbound data message has been received). If not, the process of FIG. 5A loops back and 530 may again be invoked. But if a positive determination is made at 530 (i.e., it is determined that a data message has been received), it is determined, at 532, whether a FIFO memory is empty. If it is the case that the FIFO memory is empty, then the source address of the data message found to have been received at 530 is stored in the FIFO memory, as indicated at 534. The process of FIG. 5A then loops back to 530.

If a negative determination is made at 532 (i.e., it is found that there is at least one entry in the FIFO memory that has not been serviced), then it is determined, as indicated at 536, whether the FIFO memory already holds an IP address that is the same as (i.e., a duplicate of) the IP address of the source of the inbound data message that was found to have been received at 530. If a negative determination is made at 536 (i.e., no duplicate is found of the source address in the FIFO memory), then it is determined, at 538, whether the FIFO memory is full. If not, then the source address of the data message found to have been received at 530 is stored in the FIFO memory, as indicated at 534. The process of FIG. 5A then loops back to 530. However, if a positive determination is made at 538 (i.e., the FIFO memory is found to be full), then the process of FIG. 5A loops back to 530 without storing in the FIFO memory the IP address of the source of the message.

If a positive determination is made at 536, (i.e., a duplicate of the source address is found in the FIFO memory) then the process of FIG. 5A loops back to 530 without storing in the FIFO memory (a duplicate of) the IP address of the source of the data message found to have been received at 530.

Turning now to FIG. 5B, at 550 it is determined whether transmission of a data message (e.g., a data packet) is currently requested or is pending. Transmission of a data message may be "pending", for example, when transmission of a second data message is requested while transmission of a prior data message is being handled.

If a positive determination is made at 550 (i.e., if it is determined that transmission of a data message has been requested or is pending), then appropriate steps are taken to handle transmission of the requested or pending data message or message, as indicated at 552. As part of handling the transmission of a data message, it may be necessary to search the address resolution table to ascertain the lower layer address to which the data message is to be sent. When the table entry 302 or 402 (as the case may be) which corresponds to the destination address is found, the activity data field for that table entry may, in some embodiments, be updated to reflect the activity of transmitting the data message to the destination address. The updating of the activity data field may include writing a timestamp into the activity data field. In other embodiments there may be no updating of the activity data field upon transmission of a data message to the corresponding address.

Following the handling of the transmission of the data message or data messages, the process of FIG. 5B loops back to 550.

If a negative determination is made at 550 (i.e., it is determined that transmission of a data message has not been requested and is not pending), then it is determined, at 554, whether the FIFO memory referred to in conjunction with FIG. 5A is empty. If so, the process of FIG. 5B loops back to 550.

If a negative determination is made at 554 (i.e., it is determined that the FIFO memory referred to in conjunction with FIG. 5A is not empty), then the oldest entry in the FIFO memory is serviced, as indicated at 556 and 558. In particular, as indicated at 556, the address resolution table is searched to find the entry in the address resolution table which corresponds to the oldest entry in the FIFO memory. For example, if the data processing device 100 maintains separate route and ARP tables, then the route table is searched to find the entry for the IP address which is the oldest entry in the FIFO memory. Then, based on the pointer in that route table entry, the corresponding entry in the ARP table is accessed. Alternatively, if the data processing device 100 maintains a combined route/ARP table, then that table is searched to find the entry for the IP address which is the oldest entry in the FIFO memory. The searching of the table in question may be performed in accordance with any search algorithm that is convenient, including, for example, a binary search, a linear search, a cam search, a hash search, etc. In the case of searching either the route table or the combined route/ARP table, the search (and access to APR table, if appropriate) results in finding the table entry (302 or 402, as the case may be) which contains the activity data field (306 or 408, as the case may be) which holds the activity data for the IP address that constitutes the oldest entry in the FIFO memory. Then, at 558 (FIG. 5B) the activity data field in question is updated to reflect the receipt of the data message which resulted in the storage of that IP address in the FIFO memory. For example, the activity data field may be updated by writing into it a timestamp which represents a current time reading provided by a timer. (The timer is not separately shown, but may be provided by hardware, software or firmware.)

After 558, the process of FIG. 5B loops back to 550.

Software which implements the processes illustrated in FIGS. 5A and 5B may be employed in some embodiments to program the CPU 102 (FIG. 1) and may be stored in one or more of the memory components 104.

The processes illustrated in FIGS. 5A and 5B may be varied in a number of respects. For example, the determination made at 538 in FIG. 5A (i.e., whether the FIFO memory is full) may be made after a positive determination at 532 to determine whether to store the source address of the received data message in the FIFO. As another alternative, the determination made at 538 may be made after a positive determination at 530, with the determination made at 532 being made only if it is first determined that the FIFO memory is not full.

The processes illustrated in FIGS. 5A and 5B may provide some or all of the functions and advantages which were discussed above in connection with the process of FIG. 5. The feature of checking the FIFO memory for a duplicate before storing a new entry (514 in FIG. 5 or 536 in FIG. 5A) may be of particular value, since TCP/IP communication may often result in frequent messages from the same source. If duplicate FIFO entries were not inhibited, the FIFO memory might quickly fill up with duplicate entries from the same source.

FIG. 6 is a schematic representation of a CPU 600 that may be substituted for the CPU 102 shown in FIG. 1 according to some embodiments. The CPU 600 of FIG. 6 may include communication handling logic hardware 602 that may carry out, among other functions, the functions described above with respect to FIG. 5, or the functions described above with respect to FIGS. 5A and 5B. Some details of an example of the communication handling logic hardware will be described below.

The CPU 600 also includes other logic hardware 604 which performs other functions of the CPU 600.

Figure 7:
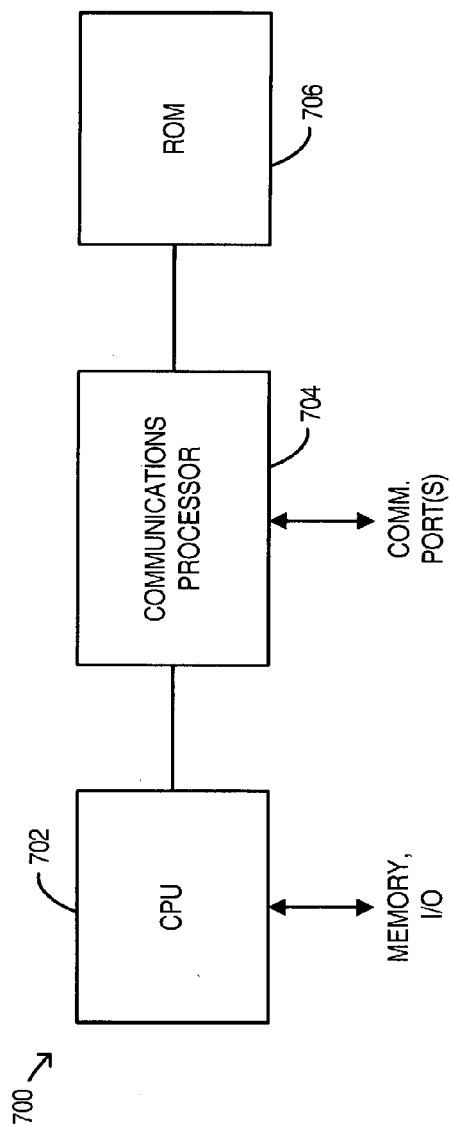
FIG. 7 is a partial block diagram of a data processing device according to some other embodiments.

FIG. 7 is a partial block diagram representation of a data processing device 700 that may be provided according to some embodiments. The data processing device 700 may be, for example, a personal computer or a laptop computer. The data processing device 700 includes a CPU 702 and a communications processor 704 coupled to the CPU between the CPU 702 and communication port(s), which are not separately shown. Also coupled to the communications processor 704 is a ROM 706 which stores firmware to control the communications processor 704 to perform the functions described in connection with FIG. 5, or in connection with FIGS. 5A and 5B.

Figure 8:
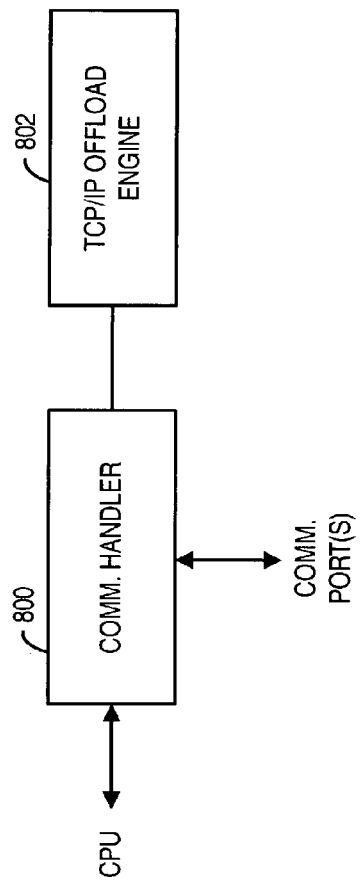
FIG. 8 is a partial block diagram of a data processing device according to still other embodiments.

According to some embodiments, the functions performed by the communications processor 704 of FIG. 7 may be divided among two or more different integrated circuits (ICs). For example, as illustrated in FIG. 8, a communication handling IC 800 may be coupled between a CPU (not shown) and communication port(s) (not shown), and may also be coupled to a TCP/IP offload engine (TOE) IC 802. The TOE 802 may perform various functions related to communications in accordance with the TCP/IP communication protocol. In some embodiments, the TOE may include logic to perform the functions described above in connection with FIG. 5.

Figure 9:
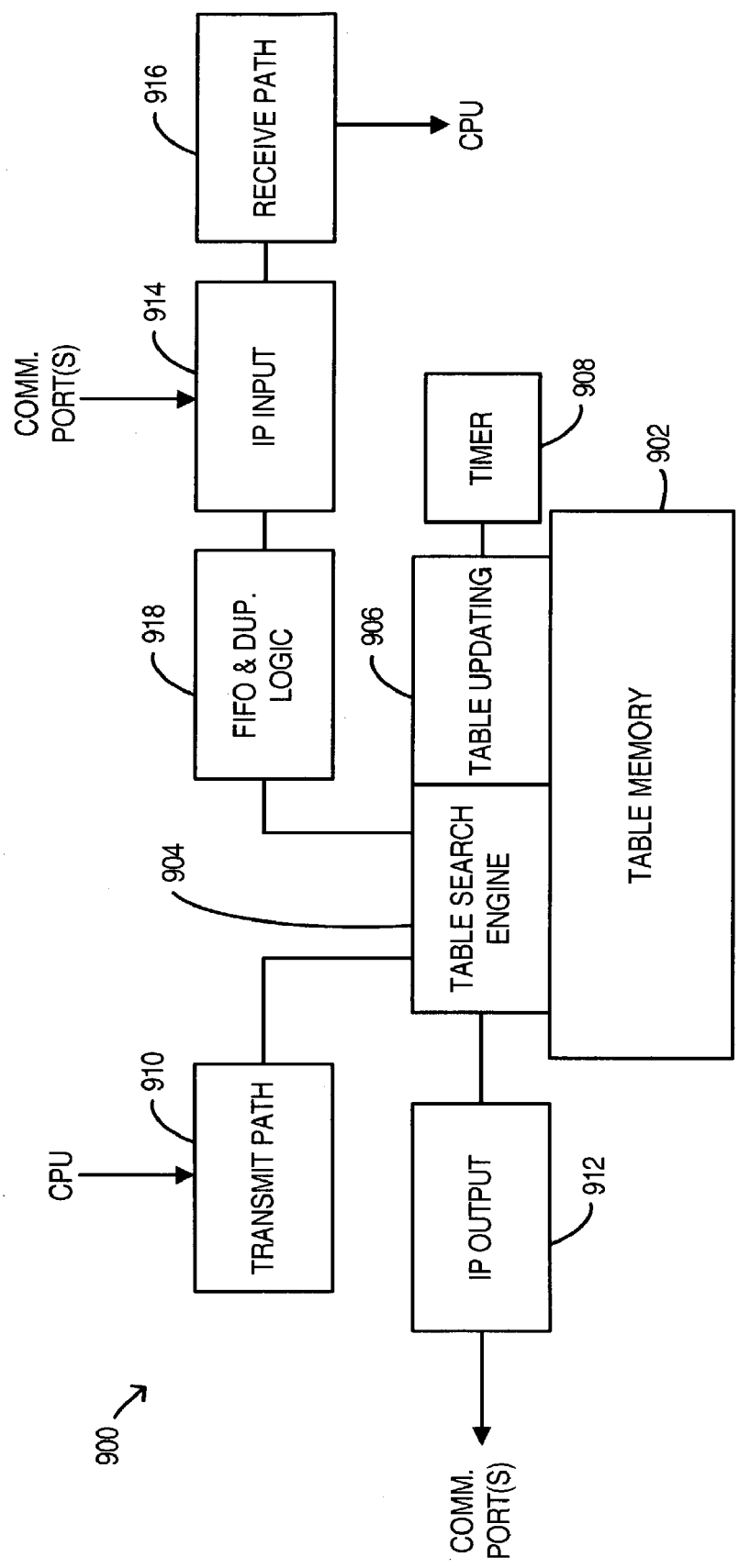
FIG. 9 is a block diagram of communication handling logic circuitry and related hardware that may be included according to some embodiments in communication handling components shown in FIGS. 6 and 8.

FIG. 9 is a block diagram of logic 900 provided in accordance with some embodiments as part of the communications handling logic 602 shown in FIG. 6 or as part of the TOE 802 shown in FIG. 8.

The logic 900 includes a table memory 902 in which an address resolution table or tables are stored. Coupled to the table memory 902 is a table search engine 904, which searches the address resolution table or tables for IP addresses that correspond either to outbound data messages to be transmitted or to inbound data messages that have been received. Table updating logic 906 is coupled to the table search engine 904 and to the table memory 902. The table updating logic 906 operates to update activity fields of table entries that correspond to the sources of inbound data messages. The table updating logic 906 may also, in some embodiments, update activity fields of table entries that correspond to the destinations of outbound data messages. A timer 908 is coupled to the table updating logic 906 and may provide timing information that is suitable for use as timestamps to be stored in the activity fields of entries of the address resolution table by the table updating logic 906.

The table search engine 904 is coupled to transmit path logic 910 that provides to the table search engine 904 IP addresses that correspond to the destinations of outbound data messages. The table search engine 904 searches the address resolution table or tables to find the destination IP addresses provided by the transmit path logic 910. Corresponding lower layer addresses found by the table search engine 904 in the address resolution table are provided by the table search engine 904 to IP output logic 912, which transmits the outbound data messages using the lower layer addresses provided by the table search engine 904. The transmit path logic 910 and the IP output logic 912 may be considered to constitute some or all of a transmit circuit which handles functions related to transmission of outbound data messages.

Inbound data messages are handled by IP input logic 914, which dispatches the inbound data messages (or the payloads thereof) in the direction of the CPU (not shown) via receive path logic 916. The IP input logic 914 also provides the IP addresses of the sources of the inbound data messages to a FIFO memory and duplication detection logic block 918 which is coupled to the table search engine 904. As would be expected from the above discussion of FIG. 5, the FIFO memory and duplication detection logic block 918 operates to pass source IP addresses of inbound data messages to the table search engine 904 either immediately upon receipt of the inbound data messages (in the case that the table search engine 904 is not occupied with searching on behalf of the transmit path logic 910 or with respect to source IP addresses previously stored in the FIFO memory at the time the inbound data message is received) or after the source IP addresses are stored in and retrieved from the FIFO memory (in the case that the table search engine 904 is occupied at the time the inbound data message is received). Thus the FIFO memory and duplication detection logic block 918 couples the IP input logic 914 to the table search engine 904. The IP input logic 914 may be considered to be at least part of a receive circuit that handles at least some functions in connection with receiving inbound data messages.

Figure 10:
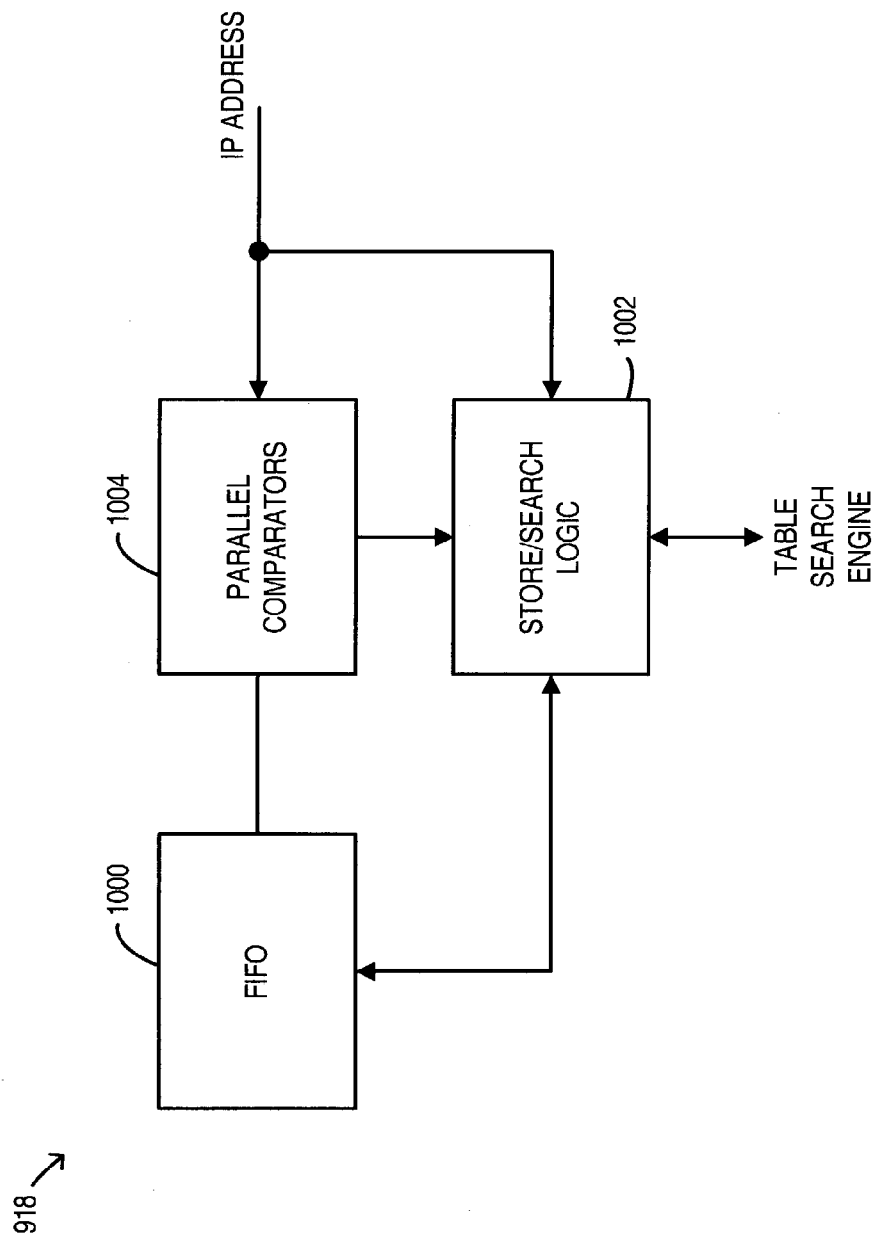
FIG. 10 is a block diagram according to some embodiments of a FIFO (first in/first out) memory and related duplicate entry detection circuitry that is a part of the communication handling logic of FIG. 9.

Some details of the FIFO memory and duplication detection logic block 918 are shown in FIG. 10. The FIFO memory and duplication detection logic block 918 includes a FIFO memory 1000 in which source IP addresses may be stored while the table search engine 904 is occupied. Store-or-search logic 1002 is coupled to the FIFO memory 1000. Parallel comparators 1004 are coupled to the FIFO memory 1000 and to the store-or-search logic 1002.

An input to the store-or-search logic 1002 from the table search engine 904 indicates when the table search engine 904 is occupied. If the table search engine 904 is not occupied and at least one IP address is stored in the FIFO memory 1000, the store or search logic 1002 causes the oldest IP address to be sent from the FIFO memory 1000 to the table search engine 904 so that the table search engine 904 searches the address resolution table(s) for the IP address in question and the table updating logic 906 causes the activity data field corresponding to the IP address to be updated with a timestamp to indicate recent activity for the IP address.

If the table search engine 904 is not occupied, the FIFO memory 1000 is empty, and a new source IP address is received, the store or search logic 1002 causes the new source IP address to be sent to the table search engine 904 so that the table search engine 904 searches the address resolution table(s) for the new IP address in question and the table updating logic 906 causes the activity field corresponding to the new source IP address to be updated with a timestamp to indicate recent activity for the IP address.

If the table search engine 904 is occupied (e.g., with a search required to support transmission of an outbound data message), and a new source IP address is received, the parallel comparators 1004 compare the new source IP address with the contents of all of the storage locations of the FIFO memory 1000. If the new source IP address matches one of the IP addresses stored in the FIFO memory, then the store-or-search logic 1002 is inhibited from storing the new source IP address in the FIFO memory 1000, and the new source IP address is simply disregarded. If the new source IP address does not match any IP address stored in the FIFO memory, then the store-or-search logic 1002 causes the new source IP address to be stored in the FIFO memory 1000.

The logic hardware illustrated in FIGS. 9 and 10 may provide substantially all the advantages of the software process described above in connection with FIG. 5 or the processes described above in connection with FIGS. 5A and 5B. Thus, searching of the address resolution table(s) in support of transmission of outbound data messages may be given priority so that table searching traffic for the purpose of activity updates in response to received data messages does not interfere with transmission of outbound data messages. Also, unnecessary searches may be prevented by disregarding new source IP addresses that duplicate IP addresses already stored in the FIFO memory.

In addition, with the logic hardware illustrated in FIG. 9, the same search logic may be employed both for searches that support transmission of outbound data messages and for activity updates in regard to inbound data messages.

In the above-described embodiments, activity fields are updated with a timestamp or other data indicative of the time at which the updating occurred. Other activity indications may alternatively be used, including, for example, one-bit activity flags.

The methods and apparatus described above have been concerned with resolution of IP addresses, but can readily be modified to resolve other types of addresses.

The several embodiments described herein are solely for the purpose of illustration. The various features described herein need not all be used together, and any one or more of those features may be incorporated in a single embodiment. Therefore, persons skilled in the art will recognize from this description that other embodiments may be practiced with various modifications and alterations.

What is claimed is:

1. A method comprising:
receiving a data message from a source device having an internet protocol address;
in response to receiving the data message, determining whether an address resolution table is being searched in regard to a message to be transmitted;
if it is determined that the address resolution table is not being searched in regard to a message to be transmitted, searching the address resolution table in regard to the source device and updating an entry in the address resolution table to indicate in the entry in the address resolution table a timing at which the data message was received, the entry corresponding to the source device; and
if it is determined that the address resolution table is being searched in regard to a message to be transmitted:
(a) storing data indicative of the source device in a FIFO memory;
(b) retrieving the data from the FIFO memory at a time when the address resolution table is not being searched in regard to a message to be transmitted and in a manner to give priority to searches of the address resolution table to support transmission of outbound data messages; and
(c) in response to the retrieval of the data from the FIFO memory, searching the address resolution table in regard to the source device and updating the entry in the address resolution table to indicate in the entry in the address resolution table a timing at which the data message was received.

2. The method of claim 1, wherein the data indicative of the source includes an Internet Protocol address.

3. The method of claim 1, wherein the updating of the entry includes storing a current value of a timer.

4. An apparatus comprising:
a memory; and
a processor coupled to the memory and programmed to:
receive a data message from a source device having an internet protocol address;
in response to receiving the data message, determine whether an address resolution table is being searched in regard to a message to be transmitted;
if it is determined that the address resolution table is not being searched in regard to a message to be transmitted, search the address resolution table in regard to the source device and update an entry in the address resolution table to indicate in the entry in the address resolution table a timing at which the data message was received, the entry corresponding to the source device; and
if it is determined that the address resolution table is being searched in regard to a message to be transmitted:
(a) store data indicative of the source device in a FIFO memory;

(b) retrieve the data from the FIFO memory at a time when the address resolution table is not being searched in regard to a message to be transmitted and in a manner to give priority to searches of the address resolution table to support transmission of outbound data messages; and (c) in response to the retrieval of the data from the FIFO memory, search the address resolution table in regard to the source device and update the entry in the address resolution table to indicate in the entry in the address resolution table a timing at which the data message was received.

5. The apparatus of claim 4, wherein the data indicative of the source includes an Internet Protocol address.

6. The apparatus of claim 4, wherein the updating of the entry includes storing a current value of a timer.

7. An apparatus comprising:

receive means for receiving a data message from a source device having an internet protocol address;

determining means, responsive to the receive means, for determining whether an address resolution table is being searched in regard to a message to be transmitted;

means, responsive to the determining means, for searching the address resolution table in regard to the source device and updating an entry in the address resolution table to indicate in the entry in the address resolution table a timing at which the data message was received, if the determining means determines that the address resolution table is not being searched in regard to a message to be transmitted, the entry corresponding to the source device; and means, responsive to the determining means, for, if the determining means determines that the address resolution table is being searched in regard to a message to be transmitted:

(a) storing data indicative of the source device in a FIFO memory;

(b) retrieving the data from the FIFO memory at a time when the address resolution table is not being searched in regard to a message to be transmitted and in a manner to give priority to searches of the address resolution table to support transmission of outbound data messages; and (c) searching the address resolution table in regard to the source device and updating the entry in the address resolution table to indicate in the entry in the address resolution table a timing at which the data message was received.

8. The apparatus of claim 7, wherein the data indicative of the source includes an Internet Protocol address.

9. The apparatus of claim 7, wherein the updating of the entry includes storing a current value of a timer.

10. An apparatus comprising:

a storage medium having stored thereon instructions that when executed by a machine result in the following:

receiving a data message from a source device having an internet protocol address;

in response to receiving the data message, determining whether an address resolution table is being searched in regard to a message to be transmitted;

if it is determined that the address resolution table is not being searched in regard to a message to be transmitted, searching the address resolution table in regard to the source device and updating an entry in the address resolution table to indicate in the entry in the address resolution table a timing at which the data message was received, the entry corresponding to the source device; and if it is determined that the address resolution table is being searched in regard to a message to be transmitted:

(a) storing data indicative of the source device in a FIFO memory;

(b) retrieving the data from the FIFO memory at a time when the address resolution table is not being searched in regard to a message to be transmitted and in a manner to give priority to searches of the address resolution table to support transmission of outbound data messages; and (c) in response to the retrieval of the data from the FIFO memory, searching the address resolution table in regard to the source device and updating the entry in the address resolution table to indicate in the entry in the address resolution table a timing at which the data message was received.

11. The apparatus of claim 10, wherein the data indicative of the source includes an Internet Protocol address.

12. The apparatus of claim 10, wherein the updating of the entry includes storing a current value of a timer.

* * * * *